United States Patent [19]

Bendoni et al.

[11] 4,291,966
[45] Sep. 29, 1981

[54] PHOTOGRAPHIC FILM ASSEMBLAGE

[75] Inventors: Leonard V. Bendoni, Framingham; Lawrence E. Green, Burlington, both of Mass.

[73] Assignee: Polaroid Corporation, Cambridge, Mass.

[21] Appl. No.: 136,801

[22] Filed: Apr. 3, 1980

[51] Int. Cl.³ .................................................. G03B 17/26
[52] U.S. Cl. ..................... 354/275; 430/500; 242/71.1; 354/83
[58] Field of Search ........................ 354/83, 84, 86, 87, 354/304, 313, 314, 275; 430/500; 242/71.1, 71.6, 71.7, 74

[56] References Cited

U.S. PATENT DOCUMENTS

| | | | |
|---|---|---|---|
| 3,270,642 | 9/1966 | Nerwin | 354/87 |
| 3,451,818 | 6/1969 | Wareham | 430/500 |
| 4,145,133 | 3/1979 | Wareham | 354/275 |
| 4,200,383 | 4/1980 | Bendoni et al. | 354/314 |
| 4,212,527 | 7/1980 | Fischer | 354/275 |

FOREIGN PATENT DOCUMENTS 1121255 3/1967 United Kingdom ................. 354/87

*Primary Examiner*—L. T. Hix
*Assistant Examiner*—Alan Mathews
*Attorney, Agent, or Firm*—Alfred E. Corrigan

[57] ABSTRACT

A photographic film assemblage including an elongate composite film structure of the self-developing or instant type for use in conventional still type cameras of the non-self-developing or non-instant type. The composite film structure includes first and second sheets which are coiled within a cylindrical cassette such that only the first sheet is uncoiled and photographically exposed within such camera. A rupturable container of processing liquid is carried by one of the sheets. After the first sheet has been exposed, it is recoiled into the cassette and the latter is then removed from the camera and placed in a processor. The processor removes the first and second sheets from the cassette in a sequence which eventually locates the second sheet in engagement with the first sheet such that the former functions to aid the spreading of the processing liquid between the two sheets as they move between a pair of rollers to initiate the formation of a visible image within the composite film structure.

9 Claims, 12 Drawing Figures

PHOTOGRAPHIC FILM ASSEMBLAGE

RELATED APPLICATION

This application is related to application Ser. No. 136,802 entitled "Processing Apparatus For Self-Developing Type Roll Film," filed on even date herewith by L. Bendoni and H. Smith.

BACKGROUND OF THE INVENTION

1. Field of the Invention

This invention relates to a photographic film assemblage of the type including a roll of self-developing or instant type film which is adapted for use in conventional still cameras of the non-instant type.

2. Description of the Prior Art

It has recently been proposed to increase the versatility of conventional still type cameras, particularly those of the 35 mm format, by providing a film assemblage of the instant or self-developing type which is especially adapted for use therewith. An example of this type of film assemblage may be found in U.S. Pat. No. 4,145,133. Specifically, the film assemblage of the '133 patent includes an elongate composite film structure comprised of superposed first and second sheets having a rupturable container of processing liquid located therebetween. The first and second sheets are originally coiled within a film cassette and when located within a camera are adapted to be simultaneously withdrawn from the cassette so as to sequentially locate individual frames of the film structure in position for the exposure of its photosensitive sheet, i.e., the first sheet, which is facing the lens of the camera. A problem with this type of film structure is that the photosensitive sheet is spaced from the focal plane of the lens by a distance at least equal to the thickness of the second sheet of the composite film structure thereby creating an out of focus condition. While this condition may produce wallet size snapshots which are visually acceptable to the every day amateur photographer, it does present a problem of image definition in transparency film when the image is enlarged, e.g., when the image is projected onto a viewing screen by a projector.

SUMMARY OF THE INVENTION

The instant invention relates to a photographic film assemblage of the type including a roll of instant or self-developing type film which is adapted for use in conventional still type cameras, preferably those of the 35 mm type. The film assemblage includes a generally cylindrical film cassette having a light sealed opening, a spool rotatably supported within the film cassette, an elongate composite film structure including a first sheet comprising a given or predetermined length of instant or self-developing type film and a second sheet, which sheets are adapted to be coiled about the spool, and a container of processing liquid which is adapted to be ruptured so as to spread its contents in contact with and between the two sheets, subsequent to the exposure of the first sheet, so as to initiate the formation of a visible image within the composite film structure.

The first and second sheets of the composite film structure are coiled about the spool in a manner which permits only the first sheet to be withdrawn from the film cassette during its exposure within a camera. After some or all of the individual frames on the first sheet have been exposed, it is rewound upon the spool and the assemblage is then removed from the camera for processing.

The processor for the composite film structure includes a first pair of rollers for partially withdrawing the composite film structure from the film cassette and a second pair of rollers which are adapted to drive the first and second sheets in superposed relation into a dark chamber, or to the exterior of the apparatus, while simultaneously spreading the processing liquid between the sheets to initiate the formation of a visible image within the composite film structure. If the film requires further protection from light after the spreading of the processing liquid, it will enter the dark chamber for a predetermined period of time, e.g., one minute, before being removed from the dark chamber. Otherwise, the composite film structure may exit directly into the ambient light. After the latent image(s) has been fully developed, the second sheet may be stripped from the first sheet. If the first sheet includes a transparent support (which faces the camera's lens) and an image-receiving layer separated from a photosensitive layer by a stripping layer, and if the processing liquid is to be spread between and in contact with the side of the first sheet which faces away from the camera's lens and the second sheet, then the second sheet is discarded after the stripping operation. Preferably, the photosensitive emulsion layer is the layer most distal from the side of the first sheet which faces the lens and its exhibits a greater adhesion to the second sheet after the spreading operation than to the next adjacent layer of the first sheet, whereby removal or stripping of the second sheet also serves to remove the photosensitive emulsion layer from the first sheet thus increasing visual acuity and brightness of the transparency and enhancing stability of the transparency by virtue of the removal of residual processing reagent in the photosensitive layer. For an example of such a composite film structure, reference is made to U.S. Pat. No. 3,682,637. If the composite film structure is of the type shown in U.S. Pat. No. 2,983,606 wherein the first sheet includes a support layer which is most distal from a photosensitive layer which, in turn, faces the camera's lens, and the second sheet includes an image-receiving layer supported by a transparent base, then the first sheet is discarded after being stripped from the second sheet. Also, if the second sheet is a positive sheet as in the aforementioned '133 patent, then the first and second sheets may remain in superposed relation after the processing liquid has been spread therebetween.

The film assemblage is loaded into the processor and an end of the first sheet is threaded between the rollers of the first pair and into a cylindrical chamber. As a door of the processor is pivoted into a closed position, a pair of blades is automatically moved into engagement with the film cassette at opposite ends of its light sealed opening so as to sever the cassette material along lines which extend circumferentially from opposite ends of the cassette opening in a manner which will enable the depth of the opening to be increased upon pressure being exerted upon the severed portion of the film cassette. With the door secured in lighttight relation with the processor housing, a motor is energized to drive the first pair of rollers in a direction which withdraws the first sheet including the exposed self-developing type film fully from the film cassette while simultaneously feeding it into the cylindrical chamber. A trailing end of the first sheet is secured to an end portion of the second sheet in such a manner that they define a leader comprised of the terminal ends of the first and second sheets with the container of processing liquid secured to one of the sheets and located therebetween. As the leader is being withdrawn from the film cassette, its increased thickness, relative to the thickness of the first sheet alone, causes the severed portion of the film cassette to move in a direction which increases the depth of the light sealed opening thereby enabling the leader to pass therethrough. When the leader emerges from the film cassette, its resiliency moves it toward a generally horizontal position wherein it engages a horizontal spread control plate and preferably the bottom of the top roller of the second pair of rollers. The drive to the first pair of rollers is automatically terminated at this point and the bottom roller of the second pair of rollers in manually pivoted into adjacency with the top roller thereby capturing the leader therebetween. The supporting structure for the bottom roller includes a member which is adapted to move one of the rollers of the first pair of rollers away from the other as the bottom roller of the second pair moves into engagement with the leader thereby rendering the first pair of rollers ineffective to drive the first sheet. Once the bottom roller is located adjacent to the top roller, the drive to the top roller is energized thereby enabling the second set of rollers to rupture the container of processing liquid and spread its contents between the first and second sheets to initiate the formation of a visible image in one of the sheets while simultaneously advancing the sheets in superposed relation toward the dark chamber. After a predetermined period of time, the composite film structure is removed from the dark chamber and the second sheet is stripped from the first sheet. In a preferred embodiment of the composite film structure, the individual frames in the first sheet may now be cut and mounted in frames for subsequent employment in a projector.

An object of the invention is to provide a photographic film assemblage including a film cassette, a composite film structure of self-developing type film including a photosensitive sheet and a spreader sheet which remains in the film cassette during exposure of the photosensitive sheet.

Another object of the invention is to provide a film assemblage of the type described with a container of processing liquid located between the sheets and a spool about which the sheets may be coiled so as to protect the container from any forces emanating from the photosensitive sheet.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 2:
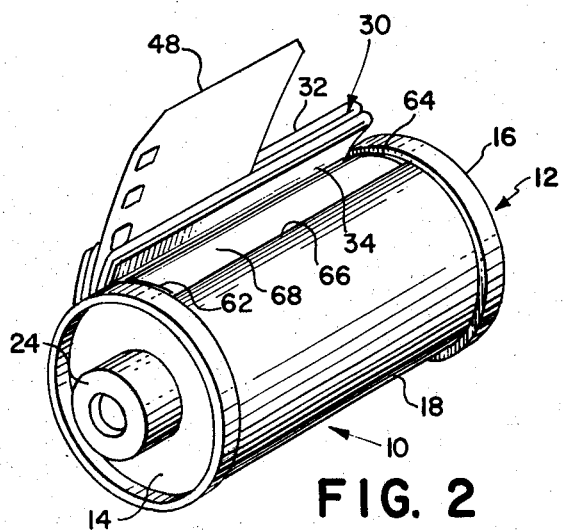
FIG. 2 is an enlarged perspective view of a photographic film assemblage which embodies one embodiment of the instant invention.
Figure 3:
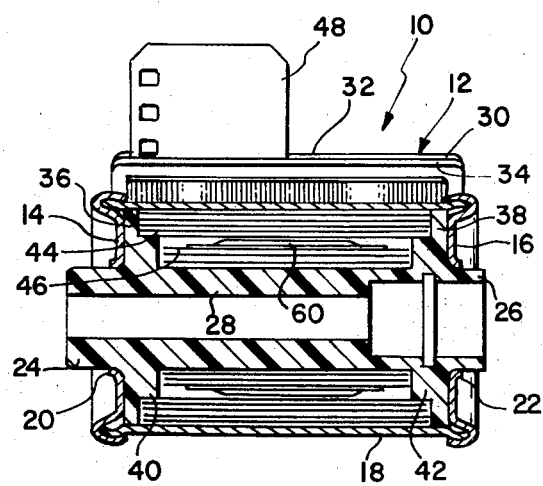
FIG. 3 is a cross-sectional view of the film assemblage of FIG. 2.
Figure 7:
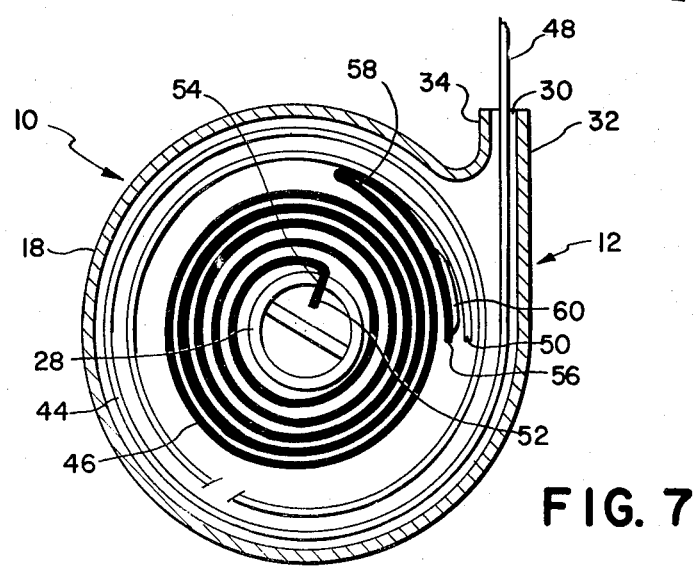
FIG. 7 is an enlarged slightly exaggerated cross-sectional view of the film assemblage of FIG. 2.

Reference is now made to the drawings and in particular to FIGS. 2, 3 and 7 wherein is shown a photographic film assemblage 10 which depicts one embodiment of the instant invention. The film assemblage 10 includes a generally cylindrical film cassette 12 formed from any suitable opaque material, the film cassette having a given length and diameter such that it may readily be usable in conventional still type cameras of the 35 mm type. The film cassette 12 includes a pair of cylindrical end sections 14 and 16 interconnected by a cylindrical main body 18 to define a substantially light-tight film chamber. The end sections 14 and 16 may be connected in any conventional manner to the main body 18 such as by press fitting. The end sections 14 and 16 each include an aperture 20, 22, respectively, for rotatably receiving the journals 24 and 26 at each end of a spool 28 thereby mounting the spool 28 for rotation about an axis extending lengthwise of the film cassette 12. The film cassette 12 is provided with an opening 30 which is light sealed to prevent the entry of ambient light into the film cassette 12. The opening 30 is defined by two flanges 32 and 34 extending from the main body 18, each of which is preferably faced with a foam-cloth laminate to provide an effective light lock.

The spool 28 includes a first pair of spaced annular collars 36 and 38 and a second pair of spaced collars 40 and 42, the function of which will be explained hereinafter.

An elongate composite film structure is adapted to be wound upon the spool 28. The composite film structure includes first and second sheets 44 and 46. The first sheet 44 comprises a predetermined length of instant or self-developing type transparency film, e.g., of the type described in U.S. Pat. No. 2,983,606, upon which a plurality of individual exposures may be made. The first sheet 44 includes a first end 48 which is adapted to extend to the outside of the film cassette 12 via the light sealed opening 30 and a second sheet 46 includes a first end 52 which is adapted to be located within a slot 54 in the spool 28, a second end 56 and an intermediate portion 58 which is secured to the first sheet 44 near its second end 50. As best seen in FIG. 7, the ends 50 and 56 of the sheets 44 and 46, respectively, are located in overlying relation with each other, and a container 60 of processing liquid is secured to one of the sheets 44 and 46, e.g., the second sheet 46, such that its contents may be spread between the two sheets during processing.

The second sheet 46 has a width less than that of the first sheet 44 (see FIG. 3) and substantially equal to the distance between the annular collars 40 and 42 and is wound upon the spool 28 such that its diameter, i.e., the diameter of the coiled sheet 46 including the container 60, is no greater than the diameter of the annular collars 40 and 42. The first sheet 44 is wound about the spool 28 such that its inner layer is in contact with the peripheral surfaces of the annular collars 40 and 42 so as to support the convolutions of the first sheet 44 in a manner whereby forces attributable to the tightness of the coil of the first sheet 44 are directed to the annular collars 40 and 42 and not to the rupturable container 60 of processing liquid thereby precluding accidental rupture of the latter.

The total thickness of two layers of the second sheet 46 and one layer of the first sheet 44, as occurs at the point of attachment of the two sheets to each other, is greater than the depth of the opening 30 to thereby preclude withdrawal of the second sheet 46 from the film cassette 12 as individual frames of the first sheet 44 are being sequentially exposed within a camera. However, to facilitate the withdrawal of the second sheet 44 and the container 60 from the film cassette 12 during processing, edge portions 62 and 64 of the main body 18 are weakened or scored such that they may be easily cut through by suitable means to be described hereinafter. Also, the main body 18 is weakened along a line 66 so as to subsequently form a hinge about which a portion 68 (including the flange 34) of the main body 18 may rotate to thereby increase the depth of the opening 30.

As stated hereinabove, the film assemblage 10 is adapted for use in conventional still cameras of the 35 mm type. The film assemblage is loaded into the camera in the conventional manner and the first end 48 of the first sheet 44 is secured to the camera's take-up spool. The first sheet 44 is withdrawn from the film cassette 12 in increments so as to locate individual frames in the focal plane of the camera's lens where they are photographically exposed. Transport of the first sheet 44 is stopped when the point of attachment of the first and second sheets 44 and 46 to each other reaches the opening 30. The first sheet is subsequently recoiled about the support or spool 28 until means (not shown) prevent further recoiling of the first sheet 44 when only the first end 48 of the first sheet 44 is located exteriorly of the film cassette 12. The film assemblage 10 is then removed from the camera and placed in a film processor 70.

Figure 1:
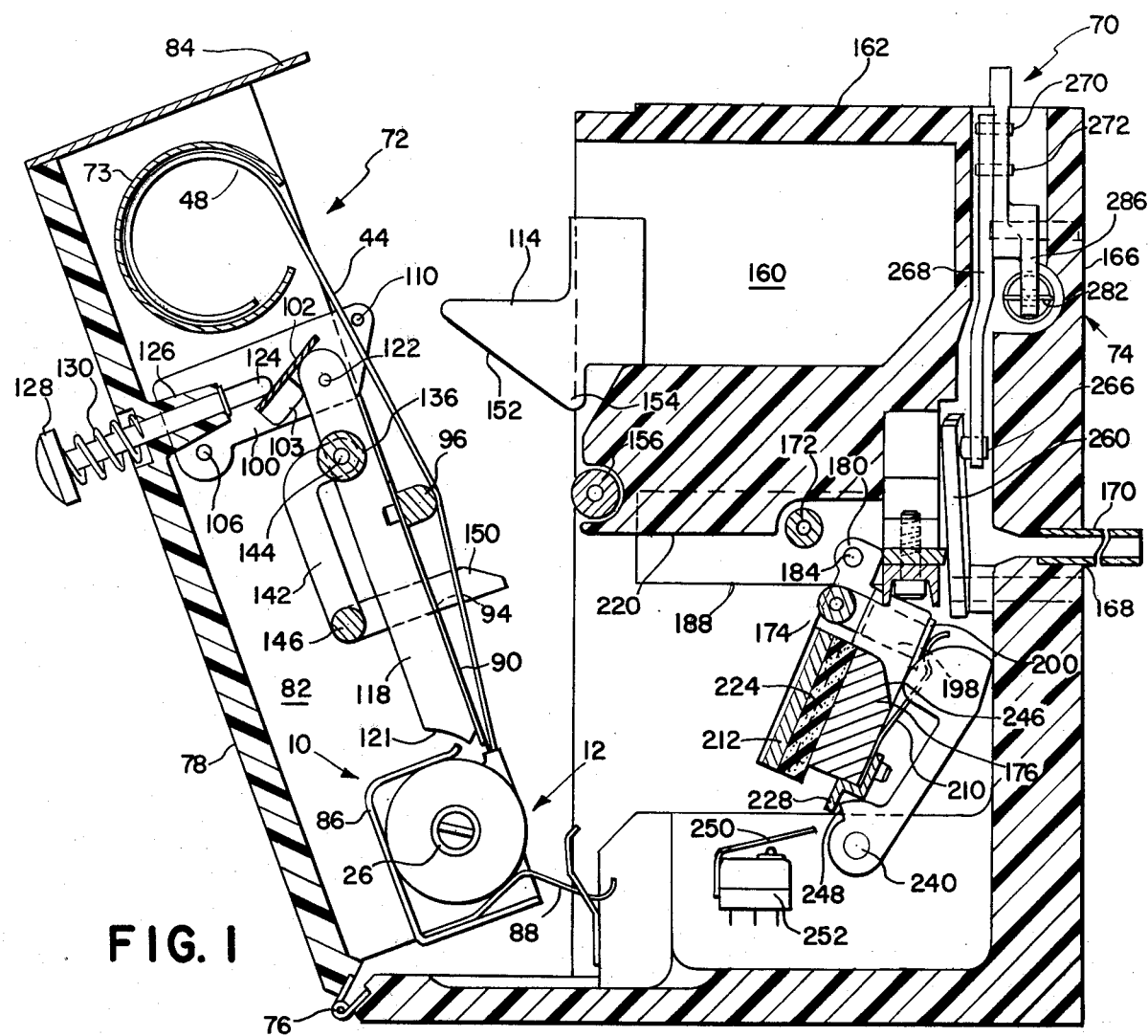
FIG. 1 is an elevational view, partly in cross-section, of a film processor which is specifically adapted for use with one embodiment of the instant invention.
Figure 4:
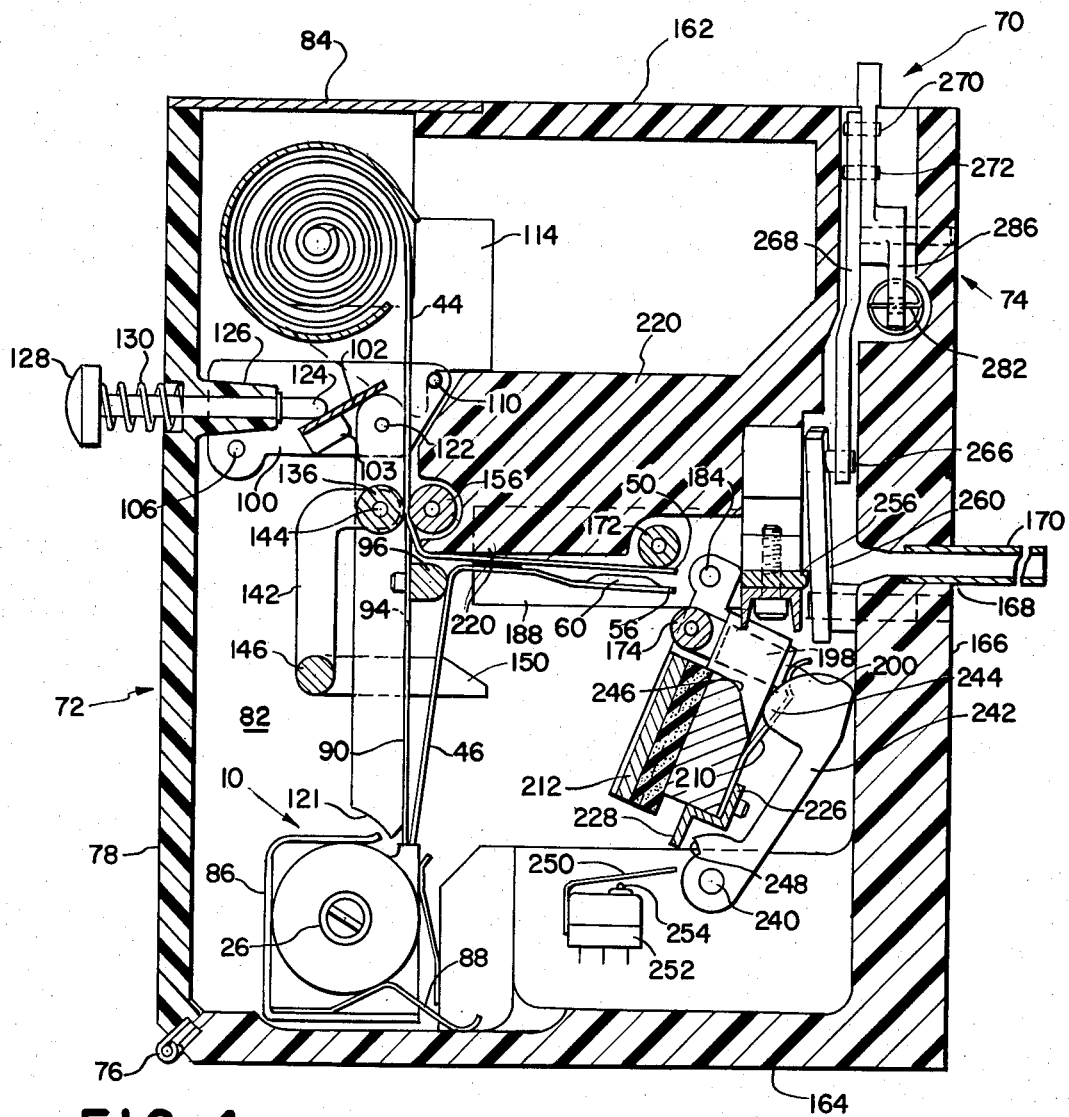
FIG. 4 is an elevational view of the film processor of FIG. 1 in a particular mode of its operation.
Figure 5:
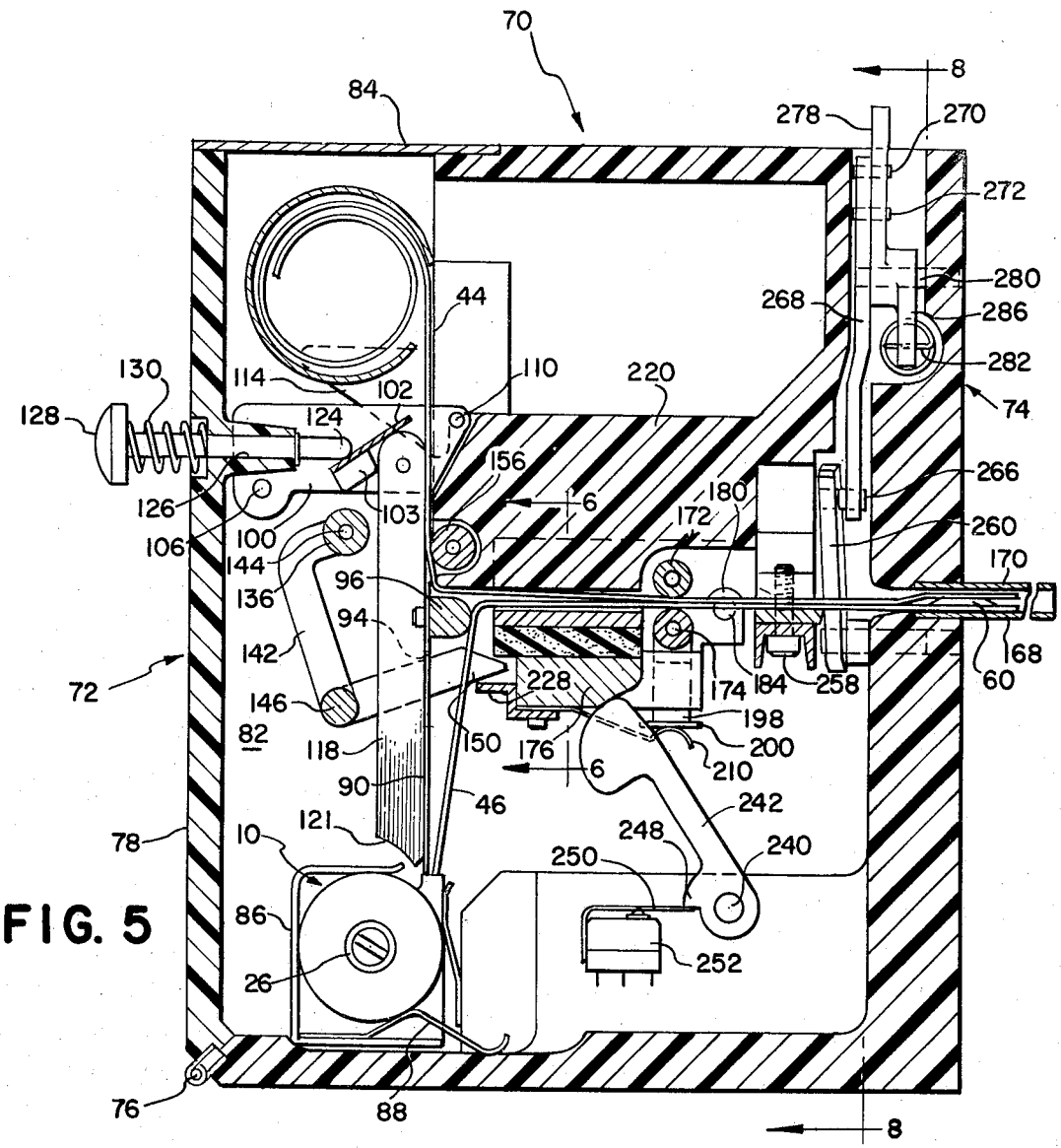
FIG. 5 is a view similar to FIG. 4 showing the film processor in another stage of its operation.

The processor 70 includes first and second housings 72 and 74, respectively, which are pivotally connected to each other about a hinge 76 for movement between a closed operative position, as shown in FIGS. 4 and 5, and an open film loading position, as shown in FIG. 1.

The first housing 72 includes a rear wall 78, a pair of side walls 80 and 82 and a top wall 84. Extending between and connected to the side walls 80 and 82 is a U-shaped bracket 86. A spring 88 extends from one of the legs of the bracket 86 and cooperates therewith to support a film assemblage 10, as shown in FIG. 1. Also extending between the side walls 80 and 82 is a thin plate 90 having a pair of vertically extending slots 92 and 94. Mounted on the plate 90 is an elongate film guide 96 having a length substantially equal to the width of the first sheet 44. A pair of substantially identically configured latch pin carrier plates 98 and 100 are coupled to each other by a U-shaped member 102 and are pivotally coupled to the side walls 80 and 82 by a pair of pins 104 and 106, respectively. Each of the plates 98 and 100 carries a pin 108 and 110, respectively, on its free end. The pins 108 and 110 are adapted to cooperate with a pair of substantially identically configured latch plates 112 and 114 which extend outwardly from the second housing 74 so as to secure the two housings 72 and 74 in the closed position, as shown in FIG. 5.

A thin elongate knife 116 and 118 is fixedly secured to each of the latch pin carrier plates 98 and 100 by rivets 120 and 122, respectively, so as to extend downwardly toward the U-shaped bracket 86 which, as shown in the drawings, is supporting the film assemblage 10. The free edge 121 of each of the knives 116 and 118 constitutes the cutting surface of each of the knives and the two cutting surfaces are adapted to be moved toward the film assemblage 10 to penetrate the main body 18 of the film cassette 12 along the edge portions 62 and 64 which extend circumferentially from opposite ends of the opening 30 and are spaced from each other by a distance greater than the width of the first sheet 44. As can best be seen in FIG. 1, the plate 90 serves to protect the hands of a person from the cutting surfaces 121 of the knives 116 and 118 during the loading and unloading of a film assemblage 10.

The legs 103 (only one being shown) of the U-shaped member 102 are fixedly secured to the plates 98 and 100. The U-shaped member 102 is located at an acute angle to the longitudinal axis of a plunger 124, which in turn is suitably supported for reciprocating movement within a boss 126 which extends inwardly from the rear wall 78 of the first housing 72. A knob 128 is located on the exteriorly located end of the plunger 124 and a spring 130 encircles the body of the plunger 124 so as to bias it to the left, as viewed in FIG. 1.

Figure 9:
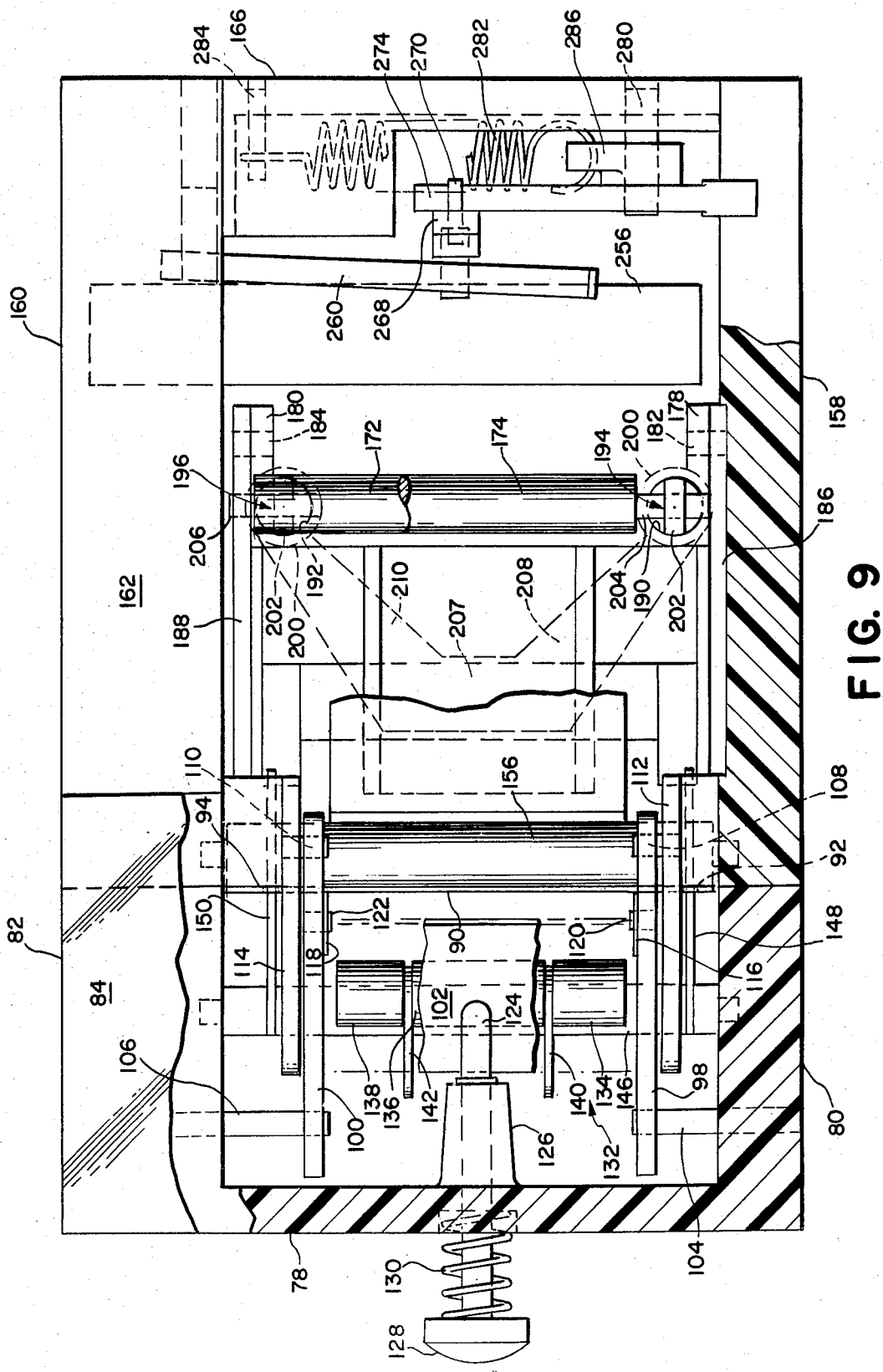
FIG. 9 is an enlarged plan view, partly in section, of the film processor, with the parts as shown in FIG. 5.

An elongate roller 132 is pivotally mounted within the first housing 72 for movement between an operative position, as shown in FIG. 4, and an inoperative position, as shown in FIG. 5. The rollerr 132, which may be formed from any suitable material having a high coefficient of friction, e.g., rubber, is formed in three separate sections 134, 136 and 138. The pivotal structure for the roller 132 includes a pair of L-shaped arms 140 and 142 having suitable apertures in their upper ends so as to receive a cylindrical rod 144 for joining the arms 140 and 142 to the roller 132, as shown in FIG. 9. Stated another way, the rod 144 is threaded through an aperture in section 134 of the roller 132, through the aperture in the arm 140, then through an aperture in roller section 136, through the aperture in the arm 142 and finally through an aperture in roller section 138. The ends of the rod 144 are then treated so as to maintain the assembly as a unit. The lower end of each of the L-shaped arms 140 and 142 is also apertured so as to fixedly receive a cylindrical rod 146, the opposite ends of which are journaled within the side walls 80 and 82. A pair of arms 148 and 150 are fixedly mounted on the rod 146 adjacent its opposite ends and extend through the slots 92 and 94 in the plate 90 and into the second housing 74. Suitable spring means and a stop (not shown) are provided for resiliently urging the roller 132 into the position shown in FIG. 1.

After the film assemblage 10 has been properly positioned within the first housing 72, as shown in FIG. 1, the first sheet 44 is grasped by the end 48 and partially withdrawn from the film cassette 12 such that it extends over the film guide 96 and is partly coiled within a cylindrical chamber 73. The first housing 72 is then pivoted about the hinge 76 in a clockwise manner to locate it in lighttight engagement with the second housing 74. As the housing 72 approaches the housing 74, the latching pins 108 and 110 engage an inclined surface 152 (only one being shown) on each of the latching plates 112 and 114. Continued clockwise rotation of the first housing 72 results in the latch pin carrier plates 98 and 100 being rotated in a clockwise manner, in response to the camming action between the pins 108, 110 and the inclined surfaces 152, thereby driving the knives 116 and 118 downwardly into cutting relationship with the main body 18 of the film cassette as the two housings 72 and 74 close upon each other. At this point, the latch pins 108 and 110 have just passed the bottom of the inclined surfaces 152 and the plates 98 and 100, which are spring biased into the position shown in FIG. 4, now rotate in a counterclockwise direction to thereby locate the latch pins 108 and 110 in locking engagement behind a leg 154 (only one shown) on each of the latching plates 112 and 114 and return the knives 116 and 118 to their original positions. With the two housings 72 and 74 thus secured in lighttight engagement with each other, the roller 132 is thus located in adjacency with a roller 156 with the first sheet 44 extending therebetween.

The second housing 74 includes top and bottom walls 162 and 164 and a forward wall 166. Secured to opposite sides of the housing 74 by suitable means, e.g., screws, are side plates 158 and 160. The forward wall 166 incudes a laterally extending slot 168 having a width slightly in excess of the width of the first sheet 44. One end of an elongate dark chamber 170 is adapted to be telescopically received in a lighttight releasable manner by the slot 168 so as to provide a receptacle for receiving the composite film structure in a light-free environment as it emerges from the processor 70.

Mounted within the second housing 74 is a second pair of elongate rollers comprised of upper and lower rollers 172 and 174, respectively, the first set of elongate rollers consisting of the aforementioned rollers 132 and 156. The bottom roller 174 is mounted on a pivotally mounted sub-assembly including a housing 176 having a pair of laterally spaced ears 178 and 180, each of which includes an aperture for pivotally receiving a pair of pivot pins 182 and 184 which extend inwardly toward each other, from a pair of plates 186 and 188, as best seen in FIG. 9. The support plates 186 and 188 are secured to the second housing 74 by any suitable means. The housing 176 is provided with a pair of laterally spaced cylindrical passages 190 and 192 which are adapted to slidably receive a pair of bottom roller support pins 194 and 196, respectively. Each of the pins 194 and 196 includes a central cylindrical section 198 having a diameter slightly less than that of the passages 190 and 192, a lower cylindrical portion 200 having a diameter greater than that of the passageways, and an upper portion 202 having a generally rectangular configuration in cross-section. Each of the upper portions 202 includes an aperture for rotatably receiving the journals 204 and 206 of the bottom roller 174. A V-shaped spring 207 having a pair of arms 208 and 210 is secured to the bottom of the housing 176 such that the curved terminal ends of the arms 208 and 210 are in engagement with the cylindrical portion 200 of each of the roller support pins 194 and 196 to thereby resiliently bias the roller 174 toward the roller 172.

Figure 6:
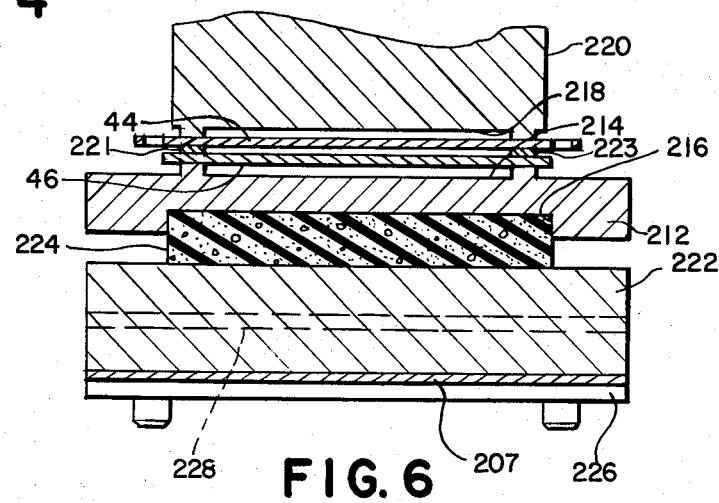
FIG. 6 is a cross-sectional view of the film processor taken generally along the line 6—6 in FIG. 5.

The housing 176 also carries means for controlling edge-wise leakage of the processing liquid from between the sheets 44 and 46 during the spreading of the processing liquid. Specifically, these means include a plate 212 having a recess 214 in its top surface and a recess 216 in its bottom surface. The recess 214 cooperates with a similar recess 218 in a block 220 to facilitate the rearward release of the processing liquid while the adjacent surfaces of the plate 212 and the block 220 prevent the processing liquid from escaping along the sides of the superposed sheets 44 and 46, as best seen in FIG. 6. The thickness of the layer of processing liquid is controlled by a pair of longitudinally extending, laterally spaced rails 221 and 223 which are secured to the sides of the first sheet 44. The plate 212 is separated from a section 222 of the housing 176 by a resilient foam pad 224 which provides a means for accommodating for various thicknesses in the superposed sheets 44 and 46 and the rails 221 and 223. A laterally extending Z-shaped flange 226 is secured to the underside of the section 222 and it includes a free end 228. As the housing 176 is pivoted into the position shown in FIG. 5, the end 228 is adapted to engage the arms 148 and 150 so as to pivot the latter and the L-shaped arms 140 and 142 in a counterclockwise manner thereby moving the roller 132 from the position shown in FIG. 4 to the position shown in FIG. 5.

Figure 8:
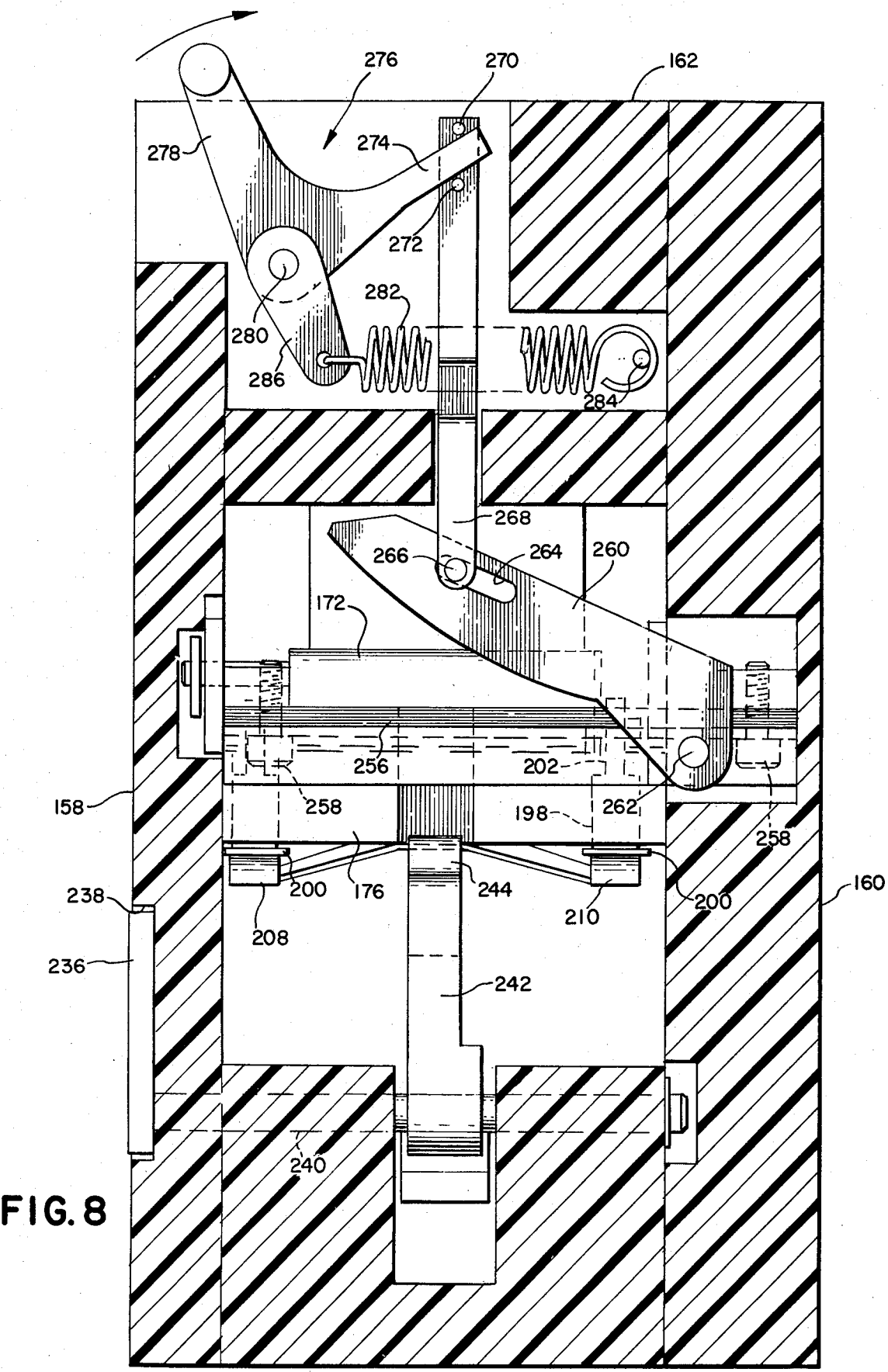
FIG. 8 is an enlarged cross-sectional view of the film processor taken generally along the line 8—8 of FIG. 5 with certain parts omitted for reasons of clarity.
Figure 10:
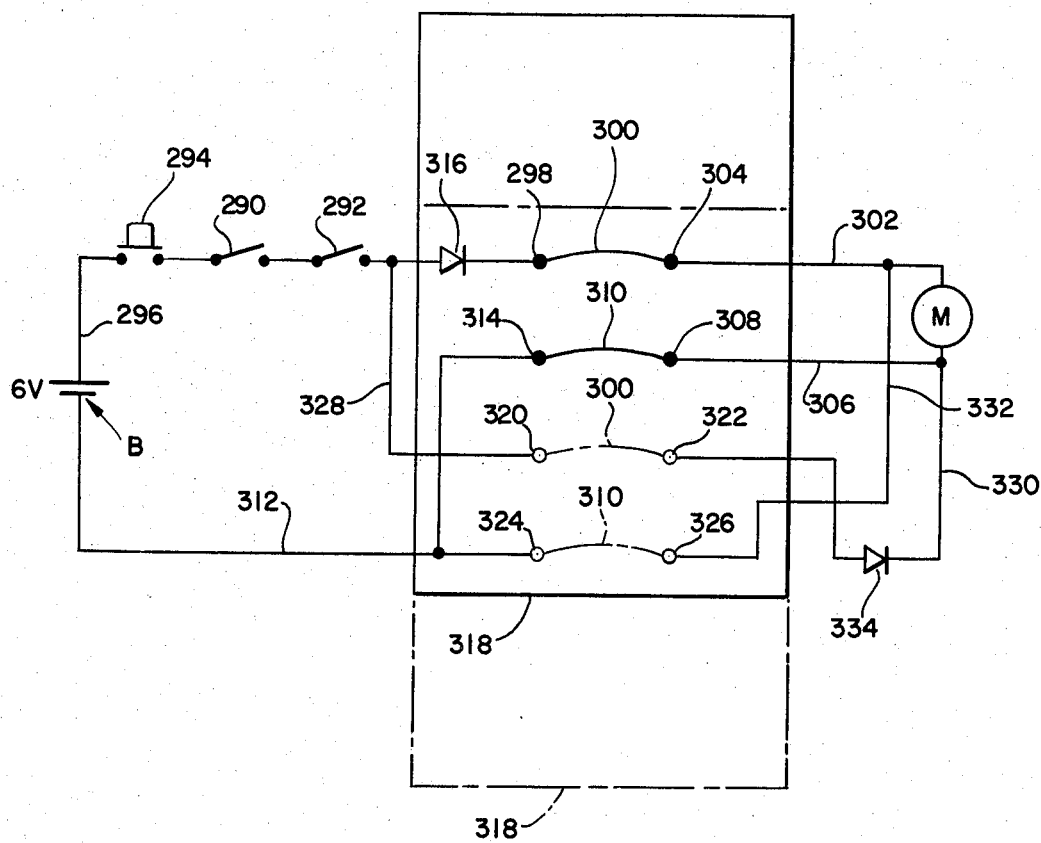
FIG. 10 is a schematic electrical diagram usable in the film processors of the instant invention.

The structure for pivoting the housing 176 from the position shown in FIG. 4 to the position shown in FIG. 5 includes a manually actuatable lever 26 situated in a recess 238 in the side plate 158 of the housing 74 (see FIG. 8). The lever 236 is fixedly attached to a end of a rod 240 which is rotatably supported within the housing 74, as best seen in FIG. 8. An arm 242 has one of its ends fixedly secured to an intermediate section of the rod 240 such that its free end 244 may be rotated through an arc which will bring the free end 244 into camming engagement with a sloped surface 246 of the bottom wall of the housing 176. The arm 242 includes an outwardly extending portion 248 which is adapted to engage and depress a lever 250 of a switch box 252 as the arm 242 is rotated in a counterclockwise direction, as viewed in FIG. 4. When the lever 250 is fully depressed, it actuates a button 254 which in turn reverses the flow of a DC current from a battery B located within the processor to the processor's motor M (see FIG. 10) so that the motor will drive the rollers 172 and 156 in a counterclockwise direction.

A shearing bar 256 is secured to an interior surface of the second housing 74 by a pair of bolts 258 at a location outboard of the rollers 172 and 174. The shearing bar 256 is adapted to cooperate with a blade 260 for severing the superposed sheets 44 and 46 from their trailing end portion, as will be explained shortly. The blade 260 is pivoted to the second housing 74 by a pin 262. An elongate slot 264 is located in the blade 260 so as to provide a means for slidably receiving a pin 266 located on an end of a lever 268. The opposite end of the lever 268 is provided with a pair of spaced pins 270 and 272 which are adapted to trap therebetween one leg 274 of a bell crank 276. The other leg 278 of the bell crank 276 extends above the top wall 162 of the second housing 74 where it may be manually grasped and rotated in the direction of the arrow (FIG. 8) about its pivot 280. The bell crank 276 is biased into the position shown in FIG. 8 by a spring 282 which is anchored at one end by a pin 284 and is secured at its opposite end to an arm 286 which is fixedly secured to the bell crank 276.

After the film assemblage 10 has been loaded into the first housing 72, as described hereinbefore, the latter is rotated in a clockwise manner from its partially open position shown in FIG. 1 into lighttight relation with the second housing 74 wherein it is releasably maintained by the latch pins 108 and 110. This action closes a normally open switch 290. Also, at this time the dark chamber 168 is located in the position shown in FIG. 1, thereby closing a second normally open switch 292. A start button 294 is then depressed to electrically connect the battery B to the motor M via a circuit including: (1) a line 296 which starts at the positive terminal of the battery B and ends at a fixed contact 298; (2) a movably mounted contact 300 located within the switch box 252; (3) a line 302 which starts at a fixed contact 304 and ends at the motor M; (4) a line 306 which starts at the opposite side (polarity wise) of the motor M and ends at a fixed contact 308; (5) another movably mounted contact 310; and (6) a line 312 having a fixed contact 314 at one of its ends and the negative terminal of the battery at its opposite end.

With the above-described circuit electrically conductive, the motor M is driven in a direction which drives the rollers 156 and 172 in a clockwise manner, as viewed in FIG. 4, thereby withdrawing the first sheet 44 from the film cassette 12 while simultaneously feeding it into the cylindrical chamber 73. The rollers 156 and 172 are interconnected by a chain drive (not shown) so as to simplify the roller driving apparatus of the film processor 70. As the first sheet 44 is withdrawn from the film cassette 12, it eventually causes the movement of the second sheet 46 towards the opening 30 in the film cassette 12 due to its attachment thereto at the intermediate portion 58 of the second sheet 46. As previously described, the forces generated by pulling both sheets 44 and 46 through the opening in superposed relation is sufficient to cause the portion 68 of the film cassette 12 to pivot slightly about the line 66 thereby increasing the depth of the opening 30 sufficiently to permit the simultaneous passage therethrough of the superposed sheets 44 and 46. As the ends 50 and 56 of the first and second sheets 44 and 46, respectively, emerge from the film cassette 12, they are forced into a generally horizontal attitude by their own resiliency as well as by the action of the sheet 44 passing over the film guide 96, as shown in FIG. 4. At this moment, a photodiode 316 (FIG. 9) senses that the leader consisting of the ends 50 and 56 is located in the position shown in FIG. 4 and electrically isolates the motor M from the battery B to stop further rotation of the rollers 156 and 172 while simultaneously lighting a bulb (not shown) to indicate that the sheets are ready to be processed.

With the composite film structure now in position to be processed, the operator rotates the lever 236 thereby rotating the bottom roller housing 176, including the roller 174, from the position shown in FIG. 4 into that shown in FIG. 5. As the housing 176 enters the position shown in FIG. 5, the lever 250 of the switch box 252 is depressed by the portion 248 of the arm 242 to change the polarity to the motor M while also pivoting the roller 132 away from the roller 156. The depression of the lever 250 results in the button 254 moving a plate 318 (see FIG. 9) from the solid line position to the broken line position. The plate 318 carries the movable contacts 300 and 310 from a solid line position wherein they bridge the fixed contacts 298, 304 and 308, 314, respectively, to a broken line position wherein they bridge the fixed contacts 320, 322, 324 and 326, respectively, thereby changing the direction of current to the motor M. In other words, the current will now flow through a line 328, which is connected at one end to line 296, the contacts 320, 300 and 322 and then a line 330 to the motor M. The return flow of the current is through a line 332, which is connected at one end to the line 306, the contacts 326, 310 and 324, and then to the line 312. Also, a second photodiode 334, located in the line 330, is electrically conductive when the leader comprised of the ends 50 and 56 and the container 60 is located as shown in FIG. 5, and is rendered non-conductive after the exposed photosensitive area of the first sheet has passed a predetermined point, e.g., the rollers 172 and 174.

The motor M drives the rollers 156 and 172 in a counterclockwise direction, thereby withdrawing the sheets 44 and 46 from the cylindrical housing 73 and the film cassette 12, respectively, while simultaneously rupturing the container 60 and spreading its contents in contact with the facing surfaces of the sheets 44 and 46 to thereby initiate the formation of visible images within the composite film structure. The rollers 172 and 174 advance the superposed sheets 44 and 46 into the dark chamber 170 until the photodiode 334 senses that all of the exposed photosensitive area of the sheet 44 has passed said predetermined point. At that moment, the photodiode 334 becomes non-conductive thereby stopping the motor M. With the motor M stopped, a timing light (not shown) on the exterior lights up for a predetermined period of time, e.g., one minute, and then goes out to signify to the operator that he may then actuate the leg 278 of the bell crank 276 to sever the liquid treated portion of the superposed sheets from the remainder of the sheets 44 and 46. The dark chamber 170 may then be removed and the severed section of the composite film structure 10 withdrawn therefrom. As stated previously, if the second sheet 46 includes the image-receiving layer of the composite film structure, then it is retained and the first sheet 44 is discarded. The individual images in the second sheet may then be cut and mounted for subsequent viewing in a projector. Alternatively, if the second sheet is a positive sheet as in the aforementioned '133 patent, then the first and second sheets 44 and 46 may remain in superposed relation.

Figure 11:
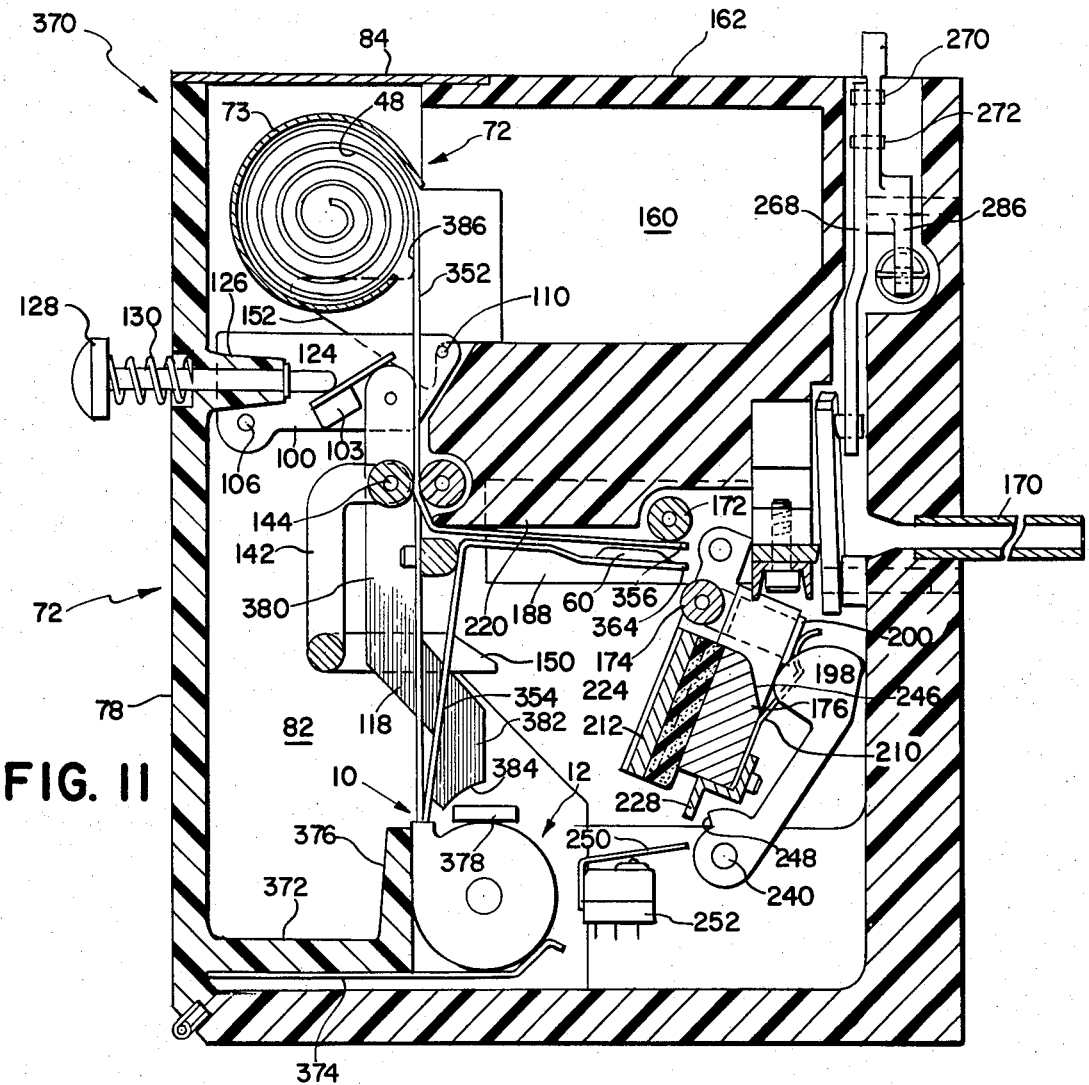
FIG. 11 is a view similar to FIG. 4 showing a preferred embodiment of a film processor.
Figure 12:
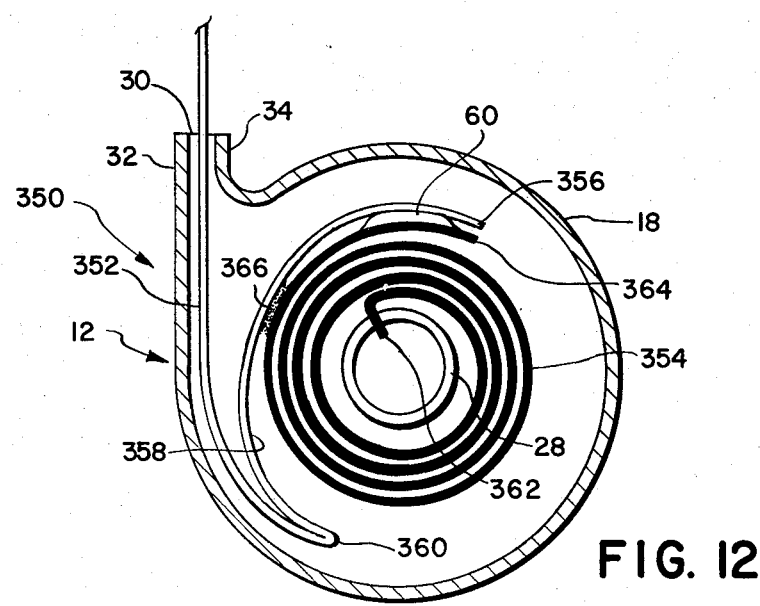
FIG. 12 is a view similar to FIG. 7 showing a preferred embodiment of a film assemblage.

Reference is now made to FIGS. 11 and 12 and especially to FIG. 12 wherein is shown a preferred embodiment of a photographic film assemblage 350. The film assemblage 350 is similar in many respects to the film assemblage 10 described above and, therefore, the same reference characters are used for the similar elements. The film assemblage 350 includes the cylindrical film cassette 12, the spool 28 rotatably supported within the film cassette 12, and an elongate composite film structure which is wound upon the spool 28 in substantially the same manner described with reference to the film assemblage 12 so as to protect the container 60 of processing liquid from being inadvertently ruptured as previously described.

The elongate composite film structure includes first and second sheets 352 and 354. As shown in FIG. 12, the first sheet 352 has been almost totally withdrawn from the film cassette so as to more clearly depict the relationship between it and the second sheet 354. The first sheet 352 comprises a predetermined length of instant or self-developing type transparency film, e.g., of a type similar to that described in U.S. Pat. No. 3,682,637, upon which a plurality of individual exposures may be made. The first sheet 352 includes a first end (not shown) which normally extends to the exterior of the film cassette via the light sealed opening 30 and a second end 356. A traling end portion 358 of the first sheet 352 is doubled back upon the remainder of the first sheet 352 at 360 such that when the first sheet 352 is fully wound upon the spool 28, it is wound in a clockwise manner going from the point 360 toward the aforementioned first end of the first sheet 352. The second sheet 354 includes a first end 362 which is secured to the spool 28, a second end 364, and an intermediate portion 366 which is releasably secured to the trailing end portion 358 of the first sheet 352 near its second end 356, e.g., approximately five centimeters (5 cm) from the end 356. As best seen in FIG. 12, the second ends 356 and 364 of the first and second sheets 352 and 354, respectively, are located in overlying relation with each other and its exposure surface faces away from the second sheet, and the container 60 of processing liquid is secured to the second sheet 354 such that its discharge end faces to the left. Also, as in the previously described film assemblage 10, the first sheet has a greater width than the second sheet and is provided with a plurality of sprocket holes along its margins while the second sheet 354 is provided with the laterally spaced, longitudinally extending rails (not shown) for controlling the thickness of the layer of processing liquid to be spread between the sheets 352 and 354. Further, the total thickness of the sheets 352 and 354 is greater than that of the opening 30 in the film cassette 12 to preclude withdrawal of the second sheet 354 from the film cassette 12 during photoexposure of the first sheet 352. However, as previously described, the cassette structure is weakened such that the withdrawal may take place within a processor.

The photograhic film assemblage 350 is adapted to be positioned within a processor 370, shown in FIG. 11. The processor 370 is substantially identical to the previously described processor 70 except for the positioning of the cassette 12 within the first housing 72 and the configuration of the knives which are used for receiving the scored portions 62 and 64 of the film cassette 12. Specifically, the first housing 72 includes an L-shaped flange 372 extending outwardly from the rear wall 78. A spring 374 is suitably attached to a lower surface of the L-shaped flange 372. The spring 374 cooperates with a leg 376 of the L-shaped flange 372 and with a pair of horizontally disposed flanges 378 (only one being shown) which extend inwardly from opposite sides of the first housing 72 so as to support the film cassette 12 in the position shown in FIG. 11. The flanges 378 function to engage the end caps 14 and 16 of the film cassette 12 so as to restrict upward or vertical movement of the film cassette 12.

The knives 116 and 118 of the processor 70 have been replaced herein by a pair of similarly spaced knives 380 (only one being shown). The knives 380 are identically configured and are located just inwardly of each flange 378. Each knife 380 includes an offset portion 382 which terminates at its lower end in a cutting edge 384. The offset portion 382 in each of the knives 380 is a result of the film cassette 12 being located within the processor 370 with the main body of the film cassette 12 located to the right of the opening 30, as viewed in FIG. 11, vis-a-vis the positioning of the film assemblage 10 in the processor 70. The film assemblage 350 is positioned as shown in FIG. 11 to insure that the emulsion side 386 of the first sheet 352, which side is opposite to the side which is to face the camera's lens, is located in face-to-face relation to the second sheet 354 during movement of the sheets 352 and 354 between the rollers 172 and 174.

After the film assemblage 350 has been loaded into the processor 370, it is processed in the same manner as described above with reference to the film assemblage 10 and the processor 70. After the elongate composite film structure comprising the first and second sheets 352 and 354, respectively, have been removed from the dark chamber 170, the second sheet 354 is stripped from the first sheet 352 and discarded. The individual visible scenes in the first sheet 352 may now be cut and mounted in suitable frames for subsequent viewing in a projector.

Since certain changes may be made in the above-described invention without departing from the scope of the invention herein involved, it is intended that all matter contained in the above description and the accompanying drawings shall be interpreted as illustrative and not in a limiting sense.

What is claimed is:

1. A photographic film assemblage for use with commercially available still picture cameras of the type having means for operably locating a single reel cassette of film of the non-self-developing type which is adapted to have sequentially photographically recorded thereon a plurality of discrete subject images when utilized in such cameras, and which cassette includes a generally cylindrical housing of a given diameter and a given length with an elongate light sealed opening extending therethrough and a spool mounted within the cylindrical housing for rotation about an axis extending lengthwise of the cylindrical housing and including a central portion around which an elongate strip of non-self-developing type film is coiled with one end thereof extending through the light sealed opening, said photographic film assemblage comprising:

a generally cylindrical housing of substantially said given length and diameter, said housing including means for defining an elongate light sealed opening extending lengthwise thereof;

support means located within said cylindrical housing for rotation about an axis extending lengthwise of said cylindrical housing;

an elongate composite film structure coiled within said cylindrical housing, said structure including a first sheet having a first end extending through said elongate light sealed opening and a second end located within said cylindrical housing and including therebetween a given length of unexposed self-developing type film sufficient to accommodate the sequential recording thereon of a plurality of discrete subject images, and a second sheet having a first end secured to said support means, a second end located in superposed relation to said second end of said first sheet, and an intermediate portion secured to said first sheet at a location spaced from but closely adjacent to said second end of said first sheet; and a container of processing liquid secured to one of said second ends and facing the other of said second ends such that its contents may be spread between said first and second sheets, subsequent to the exposure of said first sheet, to initiate the formation of a visible image within said composite film structure.

2. A photographic film assemblage as defined in claim 1 wherein said first and second sheets are coiled about said support means in the same direction within said cylindrical housing with respect to a point moving from said first ends of said sheets toward their respective said second ends.

3. A photographic film assemblage as defined in claim 2 wherein the combined thickness of said first and second sheets at their point of securement to each other is greater than the corresponding dimension of said light sealed opening.

4. A photographic film assemblage as defined in claim 2 wherein said visible image appears in said first sheet.

5. A photographic film assemblage as defined in claim 1 wherein said second sheet is transparent.

6. A photographic film assemblage as defined in claim 4 wherein said given length of self-developing type film is transparency film.

7. A photographic film assemblage as defined in claim 4 wherein said second sheet is adapted to be stripped from said first sheet a predetermined time after said processing liquid has been spread between said first and second sheets and discarded.

8. A photographic film assemblage as defined in claim 1 wherein said support means is a cylindrical member haviang a central portion of a given width about which said second sheet and said container are coiled so as not to exceed a predetermined diameter, and an outer portion having a diameter no less than that of said predetermined diameter and a width greater than said given width of said central portion for supporting said first sheet in a coiled condition, whereby said container is substantially isolated from any forces emanating from said first sheet as a result of the tightness of its coil about said outer portion.

9. A photographic film assemblage as defined in claim 1 wherein said first and second sheets are coiled about said support means in opposite directions with respect to a point moving from said first ends of said first and second sheets toward their respective said second ends.

* * * * *